United States Patent
Baer et al.

(10) Patent No.: US 9,586,554 B1
(45) Date of Patent: Mar. 7, 2017

(54) B-PILLAR TRIM STRAP FOR STRUCTURAL RIGIDITY DURING CSA DEPLOYMENT

(71) Applicant: Toyota Motor Engineering & Manufacturing North America, Inc., Erlanger, KY (US)

(72) Inventors: Mike A. Baer, Ann Arbor, MI (US); Jaime N. Moore, Ann Arbor, MI (US); Dan F. Gillay, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/195,791

(22) Filed: Jun. 28, 2016

(51) Int. Cl.
  *B60R 21/213* (2011.01)
  *B60R 21/215* (2011.01)

(52) U.S. Cl.
  CPC .......... *B60R 21/213* (2013.01); *B60R 21/215* (2013.01)

(58) Field of Classification Search
  CPC ...... B60R 21/213; B60R 21/215; B60R 21/21
  See application file for complete search history.

(56) References Cited

U.S. PATENT DOCUMENTS

| | | | |
|---|---|---|---|
| 7,025,377 B2 | 4/2006 | Ryu | |
| 7,578,521 B2 * | 8/2009 | Downey | B60R 13/025 280/730.2 |
| 7,607,684 B2 * | 10/2009 | Downey | B60R 13/025 280/728.2 |
| 7,934,748 B2 * | 5/2011 | Torii | B60R 13/025 280/728.3 |
| 7,963,551 B2 * | 6/2011 | Matsuoka | B60R 13/025 280/730.2 |
| 9,174,602 B1 | 11/2015 | Moore et al. | |
| 9,248,800 B1 * | 2/2016 | Moore | B60R 21/213 |
| 9,266,491 B1 * | 2/2016 | Gillay | B60R 21/213 |
| 2005/0236818 A1 * | 10/2005 | Hirose | B60R 21/213 280/730.2 |
| 2015/0360635 A1 * | 12/2015 | Thomas | B60R 21/213 280/730.2 |

FOREIGN PATENT DOCUMENTS

| | | | |
|---|---|---|---|
| EP | 1419940 A1 | 5/2004 | |
| EP | 1925510 A2 | 5/2008 | |
| JP | 10203278 A * | 8/1998 | ............ B60R 21/04 |

\* cited by examiner

*Primary Examiner* — Faye M Fleming
(74) *Attorney, Agent, or Firm* — Christopher G. Darrow; Darrow Mustafa PC

(57) ABSTRACT

Side pillar assemblies may include trim straps for structural rigidity during deployment of side airbag apparatuses. During deployment, the airbag can deploy from behind the roof head lining, above one or more pillar garnishes of the side pillar assembly and into the occupant compartment. A rib along the back surface of the pillar garnish may be placed in tension during a deployment event and inhibit fragmentation of the pillar garnish and limit movement of the pillar garnish into the occupant compartment. The rib may include one or more strap portions that may be placed in compression in the event of an impact on the interior facing portions of the pillar garnish. The strap portions may buckle under the compression force and provide a level of cushioning or energy dissipation due to the impact.

20 Claims, 7 Drawing Sheets

US 9,586,554 B1

B-PILLAR TRIM STRAP FOR STRUCTURAL RIGIDITY DURING CSA DEPLOYMENT

FIELD

The subject matter described herein relates in general to side pillar assemblies in vehicles and, more particularly, to a side pillar assembly with a trim strap.

BACKGROUND

Modern vehicles commonly have a variety of safety equipment to protect occupants. For example, inflatable restraints can be integrated with vehicle components located in the interior of the vehicle. Side airbag apparatuses have been proposed in which an airbag is accommodated in a folded state at a roof side rail portion at a pillar portion, behind a roof head lining. During deployment, the side airbag apparatuses can release into the vehicle compartment between the roof head lining and a pillar garnish. While it can be important to provide such a side airbag apparatus release location between the roof head lining and pillar garnish, it can be undesirable for the pillar garnish to break or extend into an occupant compartment. Further, it can be undesirable for the side airbag apparatuses to expand behind the pillar garnish. Further, it can be undesirable for the pillar garnish to be too stiff in response to an impact on an interior facing surface thereof.

SUMMARY

Side pillar assemblies may include trim straps for structural rigidity during deployment of side airbag apparatuses. The side airbag apparatuses include a side airbag that is located at the side pillar assembly, behind a roof head lining. The side airbag may be, for example, a curtain shield airbag (CSA) that may be deployed in response to one or more sensors detecting a side impact or rollover event. During deployment, the airbag can deploy from behind the roof head lining, above one or more pillar garnishes of the side pillar assembly and into the occupant compartment. In one or more arrangements, the pillar can be any one or more of the A, B, C, or D pillars. Because the airbag deploys in the vicinity of the one or more pillar garnishes, it is desirable to control (e.g., limit) movement of the one or more pillar garnishes during a deployment event. A rib along the back surface of the pillar garnish may be placed in tension during a deployment event and inhibit fragmentation of the pillar garnish and limit movement of the pillar garnish into the occupant compartment. The rib may include one or more strap portions that may be placed in compression in the event of an impact on the interior facing portions of the pillar garnish. The strap portions may buckle under the compression force and provide a level of cushioning or energy dissipation due to the impact.

In one respect, the present disclosure is directed to a vehicle pillar garnish. The pillar garnish has a first surface facing a vehicle interior, a second surface opposite the first surface, a top edge, a pair of side edges extending up to the top edge, and at least one corner portion proximate the juncture of the top edge and at least one of the side edges. A rib extends outwardly from the second surface. The rib extends along the second surface at least partially between the side edges. The rib includes at least one strap portion. The rib is placed in tension and resists deformation of the at least one corner portion toward the vehicle interior when an inflation force is applied to the second surface adjacent the top edge. The rib is placed in compression and the at least one strap portion buckles when an impact force is applied to the first surface.

In another respect, the present disclosure is directed to a vehicle pillar garnish. The pillar garnish has a first surface facing a vehicle interior, a second surface opposite the first surface, a top edge, a pair of side edges extending up to the top edge, and at least one corner portion proximate the juncture of the top edge and at least one of the side edges. A rib extends outwardly from the second surface. The rib extends along the second surface at least partially between the side edges. The rib includes at least one void that defines at least one strap portion. The rib has a first width. The at least one strap portion has a second width less than the first width. The rib is placed in tension and resists deformation of the at least one corner portion toward the vehicle interior when an inflation force is applied to the second surface adjacent the top edge. The rib is placed in compression and the at least one strap portion buckles when an impact force is applied to the first surface.

In yet another respect, the present disclosure is directed to a vehicle assembly. The vehicle assembly includes an airbag apparatus and a pillar garnish. The airbag apparatus includes an inflatable airbag body that is deployable adjacent a pillar of the vehicle. The pillar garnish has a first surface facing a vehicle interior, a second surface facing the vehicle pillar, a top edge, a pair of side edges extending up to the top edge, and at least one corner portion proximate the juncture of the top edge and at least one of the side edges. A rib extends outwardly from the second surface. The rib extends along the second surface at least partially between the side edges. The rib includes at least one strap portion. The rib is placed in tension and resists deformation of the at least one corner portion toward the vehicle interior when an inflation force is applied to the second surface adjacent the top edge by deployment of the airbag body. The rib is placed in compression and the at least one strap portion buckles when an impact force is applied to the first surface.

DETAILED DESCRIPTION

Figure 1:
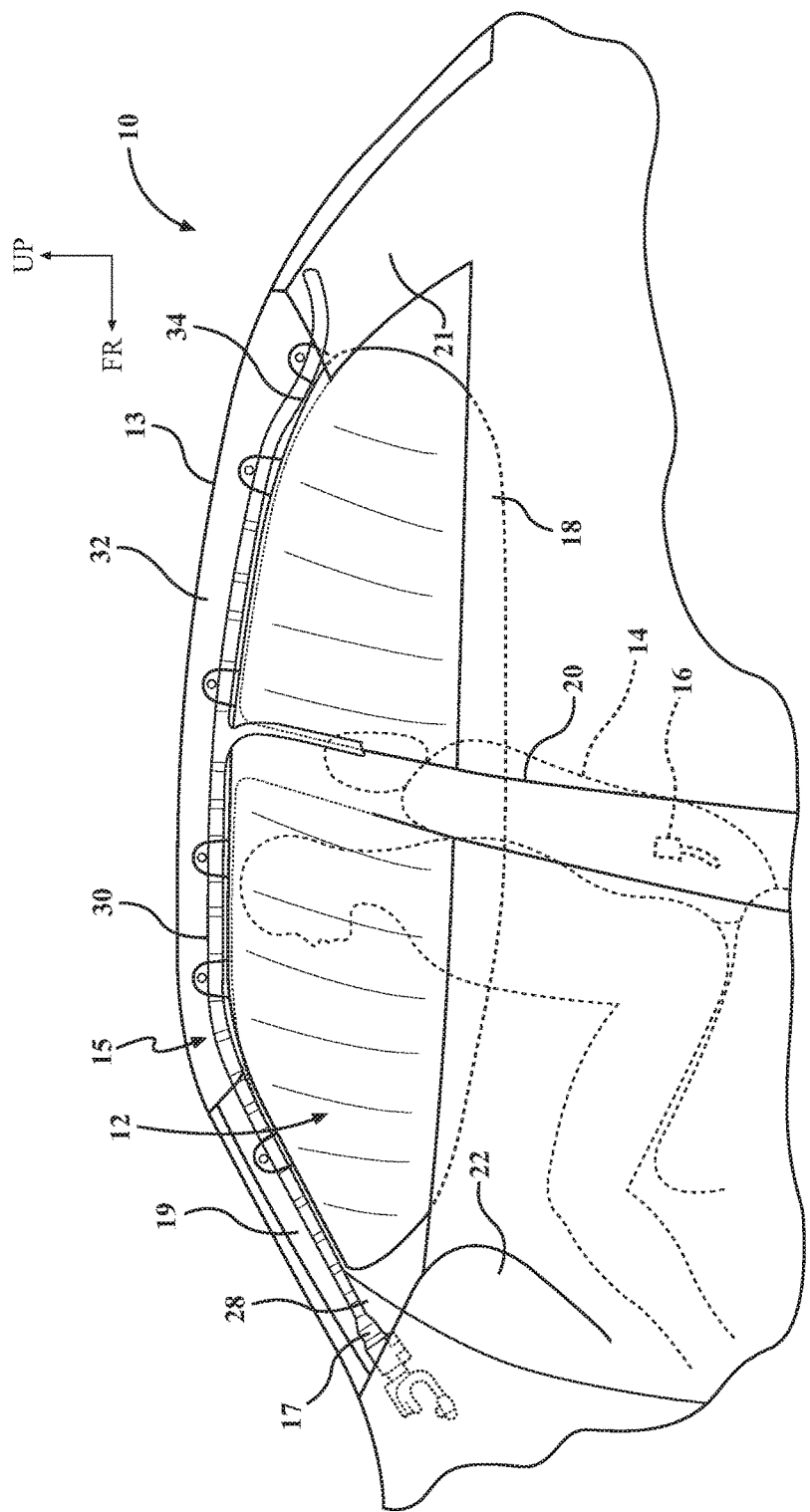
FIG. 1 is a schematic side view of a vehicle showing a state where an airbag body is deployed according to one or more embodiments described herein.

This detailed description relates generally to side pillar assemblies with trim straps for structural rigidity during deployment of side airbag apparatuses. The side airbag apparatuses include a side airbag that is located at the side pillar assembly, behind a roof head lining. The side airbag may be, for example, a curtain shield airbag (CSA) that may be deployed in response to one or more sensors detecting a side impact or rollover event. During deployment, the airbag can deploy from behind the roof head lining, above one or more pillar garnishes of the side pillar assembly and into the occupant compartment. In some embodiments, the pillar can be any one or more of the A, B, C, or D pillars. Because the airbag deploys in the vicinity of the one or more pillar garnishes, it is desirable to control (e.g., limit) movement of the one or more pillar garnishes during a deployment event. A rib along the back surface of the pillar garnish may be placed in tension during a deployment event and inhibit fragmentation of the pillar garnish and limit movement of the pillar garnish into the occupant compartment. The rib may include one or more strap portions that may be placed in compression in the event of an impact on the interior facing portions of the pillar garnish. The strap portions may buckle under the compression force and provide a level of cushioning or energy dissipation due to the impact.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

An arrow FR of the Figures indicates the forward direction of a vehicle, an arrow UP indicates the upward direction thereof.

Referring to FIG. 1, an example of a vehicle 10 is shown. As used herein, "vehicle" means any form of motorized transport. In one or more implementations, the vehicle 10 can be an automobile. While arrangements will be described herein with respect to automobiles, it will be understood that embodiments are not limited to automobiles. In some implementations, the vehicle 10 may be a watercraft, an aircraft, a train, a space craft or any other form of motorized transport.

Vehicle 10 can define an interior 12 that can be configured to transport one or more vehicle occupants. For example, vehicle 10 can generally include a floor, sides, and a roof 13 that together can partially define interior 12. In one or more arrangements, vehicle 10 can include one or more seats 14 operatively connected to the floor. The term "operatively connected" as used throughout this description, can include direct or indirect connections, including connections without direct physical contact. For example, seats 14 can be operatively connected to one or more rails which are connected to the floor or connected directly to the floor. Seats 14 can be configured for movement within interior 12. For example, seats 14 may be configured for fore and aft movement along the rails and/or move transversely within interior 12.

Vehicle 10 may include a side airbag apparatus 15 which may comprise a sensor 16 for detecting a side collision and/or rollover event, a cylindrical inflator 17 which injects gas when it is activated, and an airbag body 18. FIG. 1 depicts an illustrative vehicle 10 having an A pillar 19, a B pillar 20, and a C pillar 21. It should be understood that a vehicle having any pillar arrangement is contemplated, such as one having additional pillars. Sensor 16 may be integrated in the airbag ECU and can be disposed near a bottom end portion of B pillar 20 or any other suitable location to detect a side collision and/or rollover event when applied to vehicle 10. In some embodiments, multiple sensors may be used at the same or different locations. Inflator 17 can be disposed near a joint portion between A pillar 19 and a dashboard 22 and connected to sensor 16. In other arrangements, inflator 17 may be located at a pillar of vehicle 10 or any other suitable location. If sensor 16 detects a side collision and/or rollover event, inflator 17 can be actuated to inflate airbag body 18.

Figure 2:
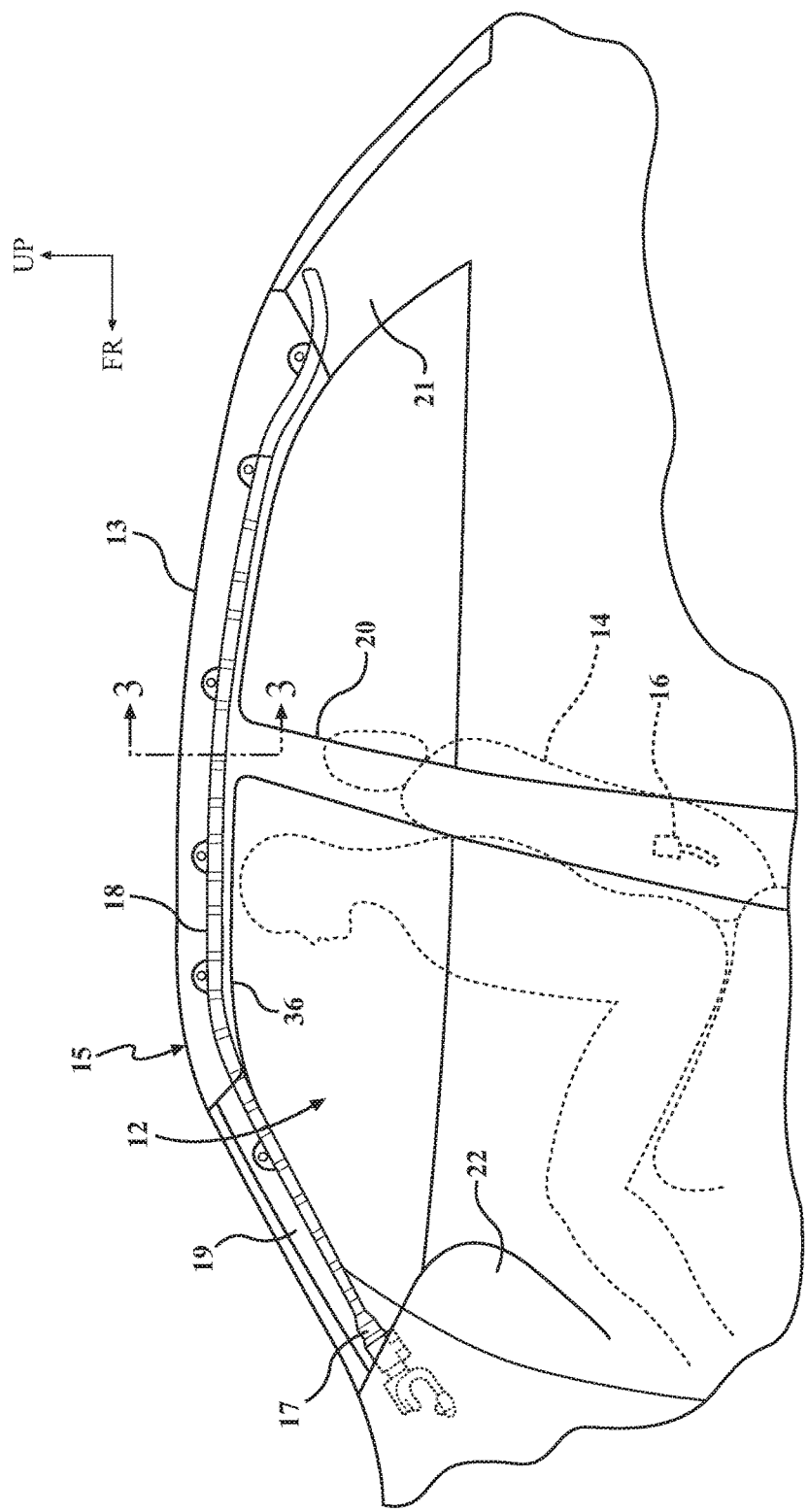
FIG. 2 is another schematic view of the vehicle of FIG. 1 where the airbag body is in a stored configuration according to one or more embodiments described herein.

A front end portion 28 of airbag body 18 may be disposed at a position where inflator 17 is disposed such that gas injected from inflator 17 flows therein. A top edge portion of a middle portion 30 of airbag body 18 may be disposed along B pillar 20 and a roof side rail 32. A rear end portion 34 may be disposed near C pillar (e.g., rear quarter pillar) 21. As shown in FIG. 2, airbag body 18 may be formed into an elongated, tube-like body by being folded, and may be accommodated over the front and central pillar garnishes and behind the roof head lining 36.

Figure 3:
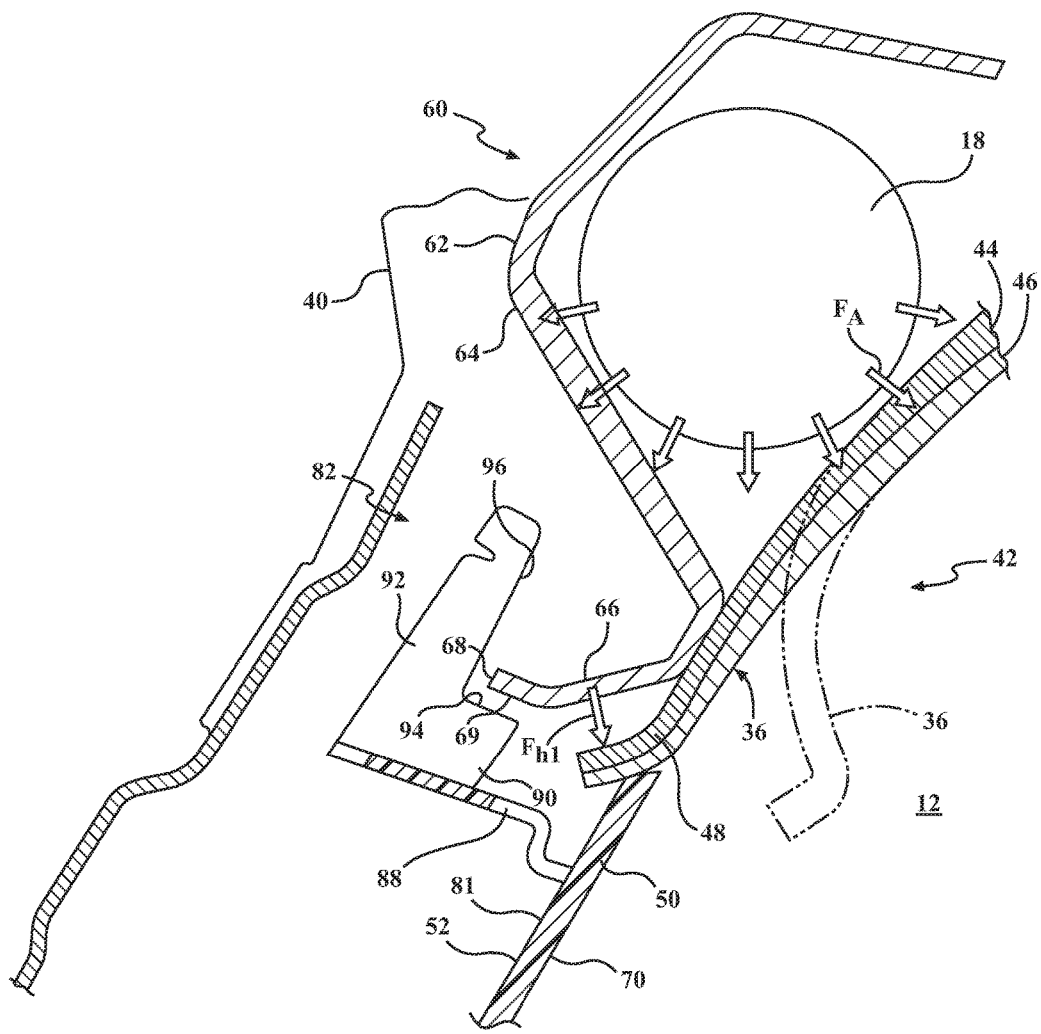
FIG. 3 is a schematic section view along line 3-3 of FIG. 2 according to one or more embodiments described herein.

Referring to FIG. 3, airbag body 18 may be located between an inner rail panel 40 and a vehicle transverse outer portion 42 of roof head lining 36. While FIG. 3 depicts an exemplary embodiment of the present disclosure located at B pillar 20, it should be understood that the embodiments depicted in FIG. 3 can be positioned at any one or more of the pillars of vehicle 10, for example, A pillar 19, C pillar 21 or, in other vehicle arrangements, a D pillar, and the like. Roof head lining 36 may be made of resin and include a base material layer 44 and a surface skin layer 46. When airbag body 18 inflates, vehicle transverse outer portion 42 of roof head lining 36 is opened inwards into interior 12 (vehicle occupant compartment) by an expanding inflation force $F_a$ of airbag body 18, as indicated in phantom in FIG. 3, so that airbag body 18 inflates in a vehicle occupant compartment inner direction through the gap thus formed. An edge portion 48 of roof head lining 36 engages an upper end portion 50 of pillar garnish 52. When airbag body 18 is expanded, the engagement between edge portion 48 of roof head lining 36 and upper end portion 50 of pillar garnish 52 is released by inflation force $F_a$ of airbag body 18.

An airbag jump bracket 60 may be fixedly disposed as an airbag body directing structure below airbag body 18. Jump bracket 60 may be formed of any suitable material, such as molded plastic or metal. Jump bracket 60 may be located within a region above pillar garnish 52, between roof head lining 36 and inner rail panel 40 and includes a first portion 62 extending in the vehicle height direction and a second portion 64 extending inwardly from first portion 62 in the vehicle width (transverse) direction. In one or more arrangements, first portion 62 may also bend around airbag body 18 in the vehicle width direction. Second portion 64 supports airbag body 18 thereon. Jump bracket 60 further includes an outwardly turned flange portion 66 extending outwardly in the vehicle width direction to underhang second portion 64 of jump bracket 60. Flange portion 66 may terminate at an end 68 located beneath second portion 64. Further, flange portion 66 may include an underside 69.

Referring also to FIGS. 4-7, pillar garnish 52 may be made of plastic or any other suitable material and may include multiple layers such as a base material and skin layers. Pillar garnish 52 may include a covering portion 70 that extends in the vehicle height direction between an upper edge 72 and a lower edge. An opening 74 may be provided in pillar garnish 52 which may accommodate passage of an occupant fastening device, such as a seat belt. Pillar garnish 52 may include side edges 76 that meet with upper edge 72 to form corner portions 78. It should be appreciated that covering portion 70, upper edge 72, side edges 76 and corner portions 78 may be configured to provide a desired aesthetic appearance and that the specific arrangement shown is merely exemplary. Corner portions 78 and upper edge 72 are subjected to force $F_a$ caused by deployment (inflation) of airbag body 18. Corner portions 78 and upper edge 72 are also subject to force $F_{hl}$ caused by roof head lining 36 being pushed inwardly from behind pillar garnish 52 toward interior 12 during deployment (inflation) of airbag body 18. Forces $F_a$ and/or $F_{hl}$ may cause deformation of pillar garnish 52 and may push corner portions 78 and upper edge 72 inwardly toward interior 12 during deployment. A stiffening rib or member 80 may extend from a back side 81 of an upper portion of pillar garnish 52. Rib 80 may have an outer edge 84 which may define the outermost extent that rib 80 extends in a direction outwardly from back side 81. Rib 80 may be adjacent upper edge 72 and may extend from one side edge 76 to the other side edge 76 along back side 81. Rib 80 may provide rigidity to limit the deformation of pillar garnish 52 into interior 12 during deployment of airbag body 18. For example, as force $F_a$ and/or $F_{hl}$ acts on each corner portion 78, rib 80 will be placed in tension and inhibit deformation of pillar garnish 52. Rib 80 resists the tensile force caused by deployment of airbag body 18 and helps retain side edges 76 and corner portions 78 in position and inhibits their fragmenting and/or intrusion into interior 12.

In one or more arrangements, rib 80 may be a separate or discrete feature which may be integrally molded with covering portion 70. In one or more arrangements, rib 80 may include and/or be integral with other features on pillar garnish 52. For example, pillar garnish 52 may include a pair of jump bracket engaging features 82 and a fastening feature 86. Rib 80, engaging features 82 and fastening feature 86 may all be integrally molded with covering portion 70 providing a unitary molded structure.

As shown in FIG. 3, each jump bracket engaging feature 82 may include a base portion 88 extending outwardly from covering portion 70 in the vehicle width direction. Each jump bracket engaging feature 82 may further include a ledge engaging portion 90 and a tower engaging portion 92 each extending upwardly from the base portion 76. Tower engaging portion 92 and ledge engaging portion 90 may be integral with tower engaging portion 92 upwardly extending beyond ledge engaging portion 90 in the vehicle height direction. Tower engaging portion 92 may include two spaced apart legs. Ledge engaging portion 90 may be positioned between tower engaging portion 92 and upper end portion 50 of pillar garnish 52 in the vehicle width direction and may be positioned between tower engaging portion 92 and interior 12 (occupant compartment) in the vehicle width direction.

Ledge engaging portion 90 is positioned adjacent underside 69 of outwardly turned flange portion 66 and tower engaging portion 92 is positioned adjacent end 68 of outwardly turned flange portion 66. During an airbag deployment event, a ledge engaging surface 94 of ledge engaging portion 90 may engage underside 69 and a tower engaging surface 96 of tower engaging portion 92 may engage end 68. Tower engaging portion 92 may extend upwardly beyond end 68 of outwardly turned flange portion 66 in the vehicle height direction. Further, the ledge engaging portion 90 may coextend, extend beyond, or extend below the upper end portion 50 of the pillar garnish 52 in the vehicle height direction.

In operation, tower engaging portion 92 may limit movement of upper end portion 50 of pillar garnish 52 into interior 12, for example, during an airbag deployment event. Further, ledge engaging portion 90 may limit movement of jump bracket 60 in a vehicle height direction such that jump bracket 60 directs airbag body 18 upwardly beyond upper end portion 50 of pillar garnish 52 and prevents jump bracket 60 from directing airbag body 18 between the inner rail panel 40 and pillar garnish 52.

Fastening feature 86 may be configured to receive a fastening member 98 therein. For example, fastening feature 86 may include a slot or opening 100 in which fastening member 98 may be secured. Fastening member 98 may be a removable push fastener that engages with a complimentary opening associated with B-pillar 20 to secure pillar garnish 52 thereto, as known in the art.

In one or more arrangements, pillar garnish 52 may be configured to provide a desired degree of cushioning in the event of an impact on the interior facing portion of pillar garnish 52. Pillar garnish 52 may be configured to allow deflection of corner portions 76 in the event of an impact to provide the desired degree of cushioning, as described below.

In one or more arrangements, rib 80 may include one or more strap portions 102 to facilitate cushioning in the event of an impact. For example, a strap portion 102 may be located in rib 80 below each engaging feature 82 and/or in the space between each engaging features 82 and fastening feature 86. Strap portions 102 represent a portion of rib 80 where the width W (amount of rib extending in a direction outwardly relative to back side 81 of pillar garnish 52) is less than that of the section of rib 80 on one or both sides thereof. For example, rib 80 may have a width W as it extends from back side 81 of pillar garnish 52 to outer edge 84. Width W may varying along rib 80 as rib 80 extends between side edges 76. Strap portions 102 may be formed by having voids in rib 80 such that rib 80 has variations in its width W. The voids may be formed by notches and/or holes in or along rib 80, as described below.

In one or more arrangements, rib 80 may have a thickness T. Strap portions 102 may have a thickness $T_s$. Thickness $T_s$ may be the same as, less than, or greater than thickness T. The mechanical properties of rib 80 and strap portions 102 may be varied by varying the associated thicknesses T, $T_s$.

Figure 4:
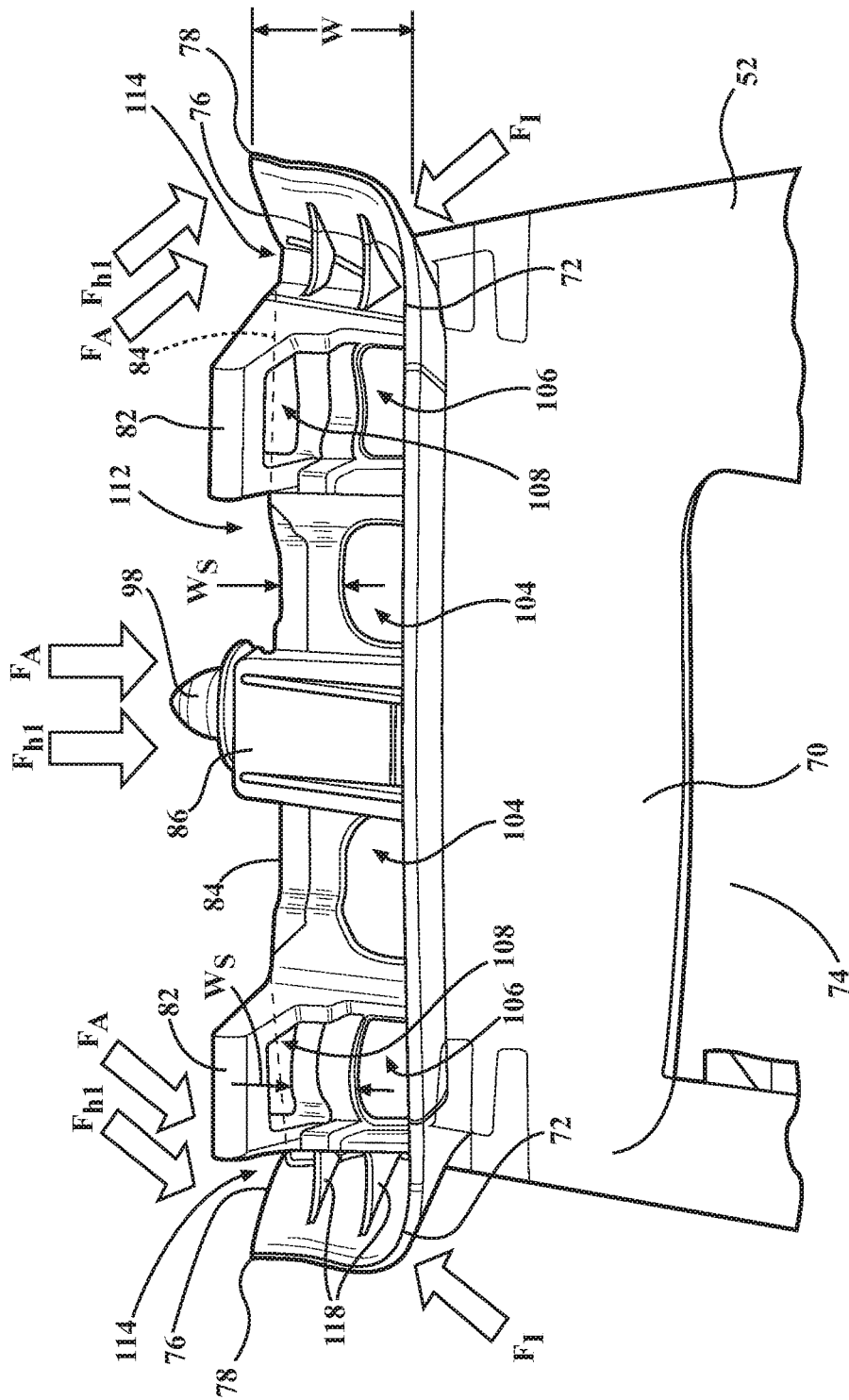
FIG. 4 is an interior fragmented perspective view of a pillar garnish according to one or more embodiments described herein.
Figure 5:
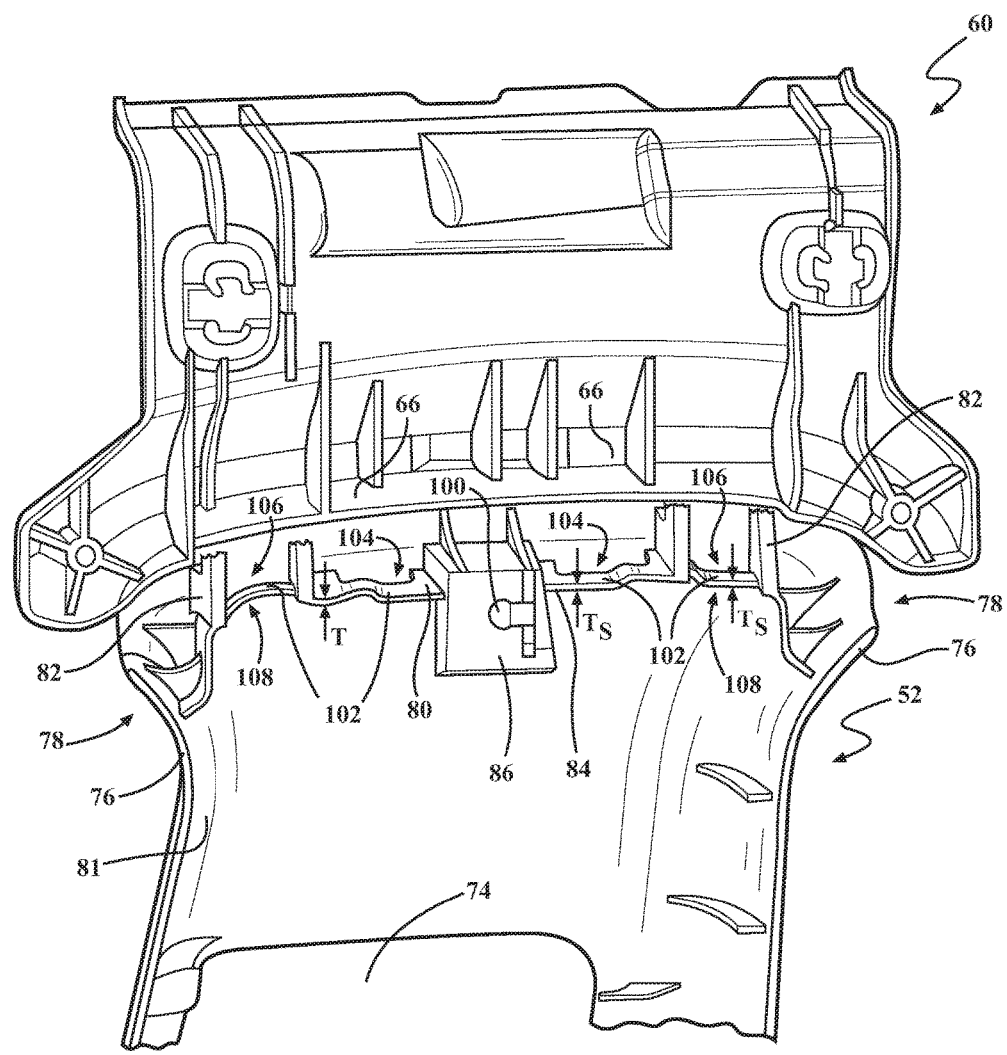
FIG. 5 is an exterior fragmented perspective view of the pillar garnish of FIG. 4 and an airbag jump bracket with the engaging features fragmented according to one or more embodiments described herein.
Figure 6:
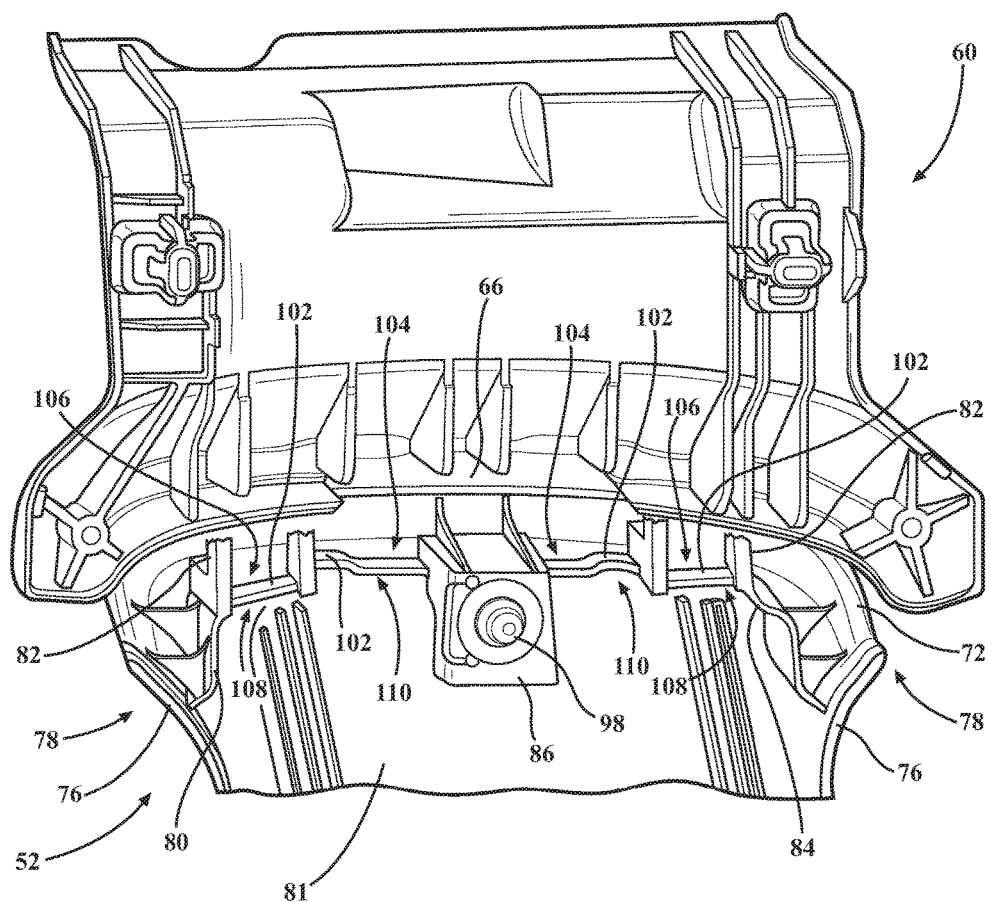
FIG. 6 is an exterior fragmented perspective view of another pillar garnish and airbag jump bracket with the engaging features fragmented according to one or more embodiments described herein.

In one or more arrangements, variations in width W may be formed by having holes 104 along rib 80 such that rib 80 is not continuously attached to back side 81 as it extends between side edges 76. For example, as shown in FIGS. 4-6, holes 104 may be formed in rib 80 in the sections between engaging features 82 and fastening feature 86. Holes 104 reduce the width of rib 80 in that section such that strap portions 102 have a width $W_s$ for that portion of rib 80. Width $W_s$ is less than Width W of rib 80 on either side of hole 104. In one or more arrangements, variations in width W may be formed by having holes 106 formed in rib 80 in the sections below engaging features 82. Holes 106 reduce the width of rib 80 in that section such that strap portions 102 have a width $W_s$ for that portion of rib 80. Width $W_s$ is less than Width W of rib 80 on either side of holes 106.

In one or more arrangements, variations in width W may be formed by having notches 108 along rib 80 such that outer edge 84 is not a continuous distance from back side 81 as rib 80 extends between side edges 76. Notches 108 are combined with holes 106 to form a strap portion 102. For example, as shown in FIGS. 4-6, notches 108 may be formed in outer edge 84 in rib 80 in the sections below engaging features 82. The theoretical outer edge 84 if notches 108 were not present is shown in phantom in FIG. 4. Notches 108 and holes 106 reduce the width of rib 80 in that section such that strap portions 102 have a width $W_s$ for that portion of rib 80. Width $W_s$ is less than Width W of rib 80 on either side of notches 108.

In one or more arrangements, variations in width W may be formed by having notches 110 along rib 80 such that outer edge 84 is not a continuous distance from back side 81 as rib 80 extends between side edges 76. For example, as shown in FIG. 6, notches 110 may be formed in outer edge 84 in rib 80 in the sections between engaging features 82 and fastening feature 86. Notches 110 reduce the width of rib 80 in that section such that strap portions 102 have a width $W_s$ for that portion of rib 80. Width $W_s$ is less than Width W of rib 80 on either side of notch 110.

Figure 7:
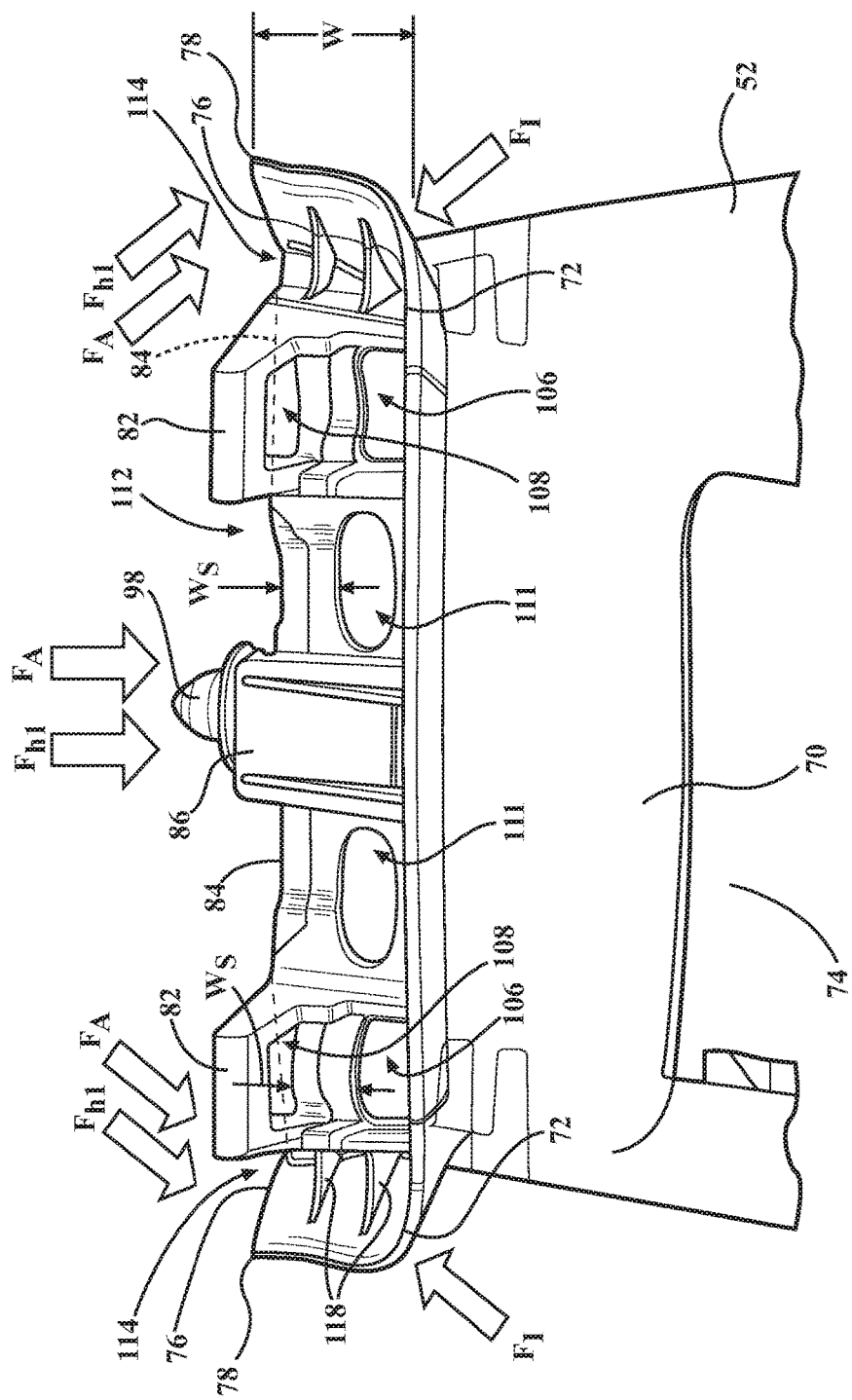
FIG. 7 is an interior fragmented perspective view of another pillar garnish according to one or more embodiments described herein.

In one or more arrangements, variations in width W may be formed by having holes 111 in rib 80 such that rib 80 does not extend continuously outwardly from back side 81 of pillar garnish 52. For example, as shown in FIG. 7, holes 111 may be formed in rib 80 in the sections between engaging features 82 and fastening feature 86 with a portion of rib 80 still present on back side 81 adjacent hole 111. Holes 111 reduce the effective width of rib 80 in that section such that strap portions 102 have a width $W_s$ for that portion of rib 80. Width $W_s$ is less than Width W of rib 80 on either side of hole 111. It should be appreciated that holes could be formed in rib 80 in the sections below engaging features 82.

The differences in widths $W_s$ of strap portions 102 relative to the widths W of other sections of rib 80 along with the differences in thicknesses $T_s$, T allow rib 80 and pillar garnish 52 to have desired properties. For example, strap portions 102 are more susceptible to buckling in the event of an impact on the interior facing surface of pillar garnish 52. For example, as shown in FIG. 4, an impact force $F_I$ may be exerted in the upper portion of pillar garnish 52, such in corner portions 78. Impact force $F_I$ results in a compressive force being exerted on rib 80. Strap portions 102, having a reduced width $W_s$, will be more susceptible to buckling in response to the compressive force then the portions of rib 80 having the larger width W. Similarly, strap portions 102 having a reduced thickness $T_s$ will be more susceptible to buckling in response to the compressive force then the portions of rib 80 having a larger thickness T. The buckling of strap portions 102 allows corner portions 78 to deflect and provide a cushioning effect.

In one or more arrangements, rib 80 may include a central portion 112 and end portions 114 on either end thereof. End portions 114 may terminate at side edge 76. End portions 114 may extend vertically from central portion 112. One or more buttresses 118 may extend from end portions 114 to side edges 76.

Accordingly, pillar garnish 52 may be configured to provide a desired level of cushioning by facilitating the deflection of corner portions 78 in response to an impact force Fi and to retain side edges 76 and corner portions 78 in position and inhibit their fragmenting and/or intrusion into interior 12 in response to a deployment event and the resulting forces $F_a$, $F_{hl}$ imparted thereon. Pillar garnish 52 may utilize rib 80 to provide the desired performance characteristics by configuring the response to a tensile force and a compressive force imparted thereon. The shape, size, location and number of strap portions 102 and rib 80 may be varied to provide the desired performance characteristics. Additionally, when multiple strap portions 102 are utilized, the various strap portions 102 may be the same as, similar to or different from one another to provide the desired performance characteristics. Moreover, while the various voids are shown with a particular shape/geometry, it should be appreciated that the shape/geometry may vary from that shown. For example, the voids may be U-shaped, circular, oval, tapering or slots that provide for the desired buckling characteristics.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

Aspects herein can be embodied in other forms without departing from the spirit or essential attributes thereof. Accordingly, reference should be made to the following claims, rather than to the foregoing specification, as indicating the scope of the invention. It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means plus-function format and are not intended to be interpreted based on 35 U.S.C. 112, sixth paragraph, unless and until such claim limitations expressly use the phrase "means for" followed by a statement of function void of further structure.

What is claimed is:

1. A vehicle pillar garnish comprising:
  a first surface facing a vehicle interior;
  a second surface opposite the first surface;
  a top edge;
  a pair of side edges extending up to the top edge;
  at least one corner portion proximate the juncture of the top edge and at least one of the side edges; and
  a rib extending outwardly from the second surface, the rib extending along the second surface at least partially between the side edges, the rib including at least one strap portion, wherein the rib is placed in tension and resists deformation of the at least one corner portion toward the vehicle interior when an inflation force is applied to the second surface adjacent the top edge and the rib is placed in compression and the at least one strap portion buckles when an impact force is applied to the first surface.

2. The pillar garnish of claim 1, wherein the rib includes at least one void and the at least one strap portion is defined by the at least one void.

3. The pillar garnish of claim 2, wherein the at least one void is at least two voids and the at least one strap portion is at least two strap portions.

4. The pillar garnish of claim 3, wherein the rib has an outer edge spaced apart from the second surface, a first one of the voids is between the second surface and the outer edge such that a first one of the strap portions is disposed away from the second surface with the void therebetween, a second one of the voids is along the outer edge, and a second one of the strap portions is disposed inward of the outer edge adjacent the second void.

5. The pillar garnish of claim 2, wherein the at least one void in the rib is between the second surface and an outer edge of the rib and the at least one strap portion is disposed away from the second surface with the void therebetween.

6. The pillar garnish of claim 2, wherein the rib has an outer edge spaced apart from the second surface, the at least one void in the rib is along the outer edge, and the at least one strap portion is disposed inward of the outer edge adjacent the at least one void.

7. The pillar garnish of claim 2, wherein the rib has an outer edge spaced apart from the second surface, the at least one void is at least two voids, a first one of the voids is between the second surface and the outer edge such that the at least one strap portion is disposed away from the second surface with the first void therebetween, a second one of the voids is along the outer edge, and the at least one strap portion is disposed inward of the outer edge adjacent the second void.

8. The pillar garnish of claim 2, wherein the at least one void and the at least one strap portion are disposed between a fastening feature and an engaging feature that engages with an airbag jump bracket.

9. The pillar garnish of claim 2, wherein the at least one void and the at least one strap portion are disposed between legs of an engaging feature that engages with an airbag jump bracket.

10. The pillar garnish of claim 1, wherein the rib has a first width, the at least one strap portion has a second width, and the second width is less than the first width.

11. The pillar garnish of claim 1, wherein the rib has a first thickness, the at least one strap portion has a second thickness, and the second thickness is different than the first thickness.

12. A vehicle pillar garnish comprising:
a first surface facing a vehicle interior;
a second surface opposite the first surface;
a top edge;
a pair of side edges extending up to the top edge;
at least one corner portion proximate the juncture of the top edge and at least one of the side edges; and
a rib extending outwardly from the second surface, the rib extending along the second surface at least partially between the side edges, the rib including at least one void that defines at least one strap portion, the rib has a first width, and the at least one strap portion has a second width less than the first width,
wherein the rib is placed in tension and resists deformation of the at least one corner portion toward the vehicle interior when an inflation force is applied to the second surface adjacent the top edge and the rib is placed in compression and the at least one strap portion buckles when an impact force is applied to the first surface.

13. The pillar garnish of claim 12, wherein the rib has an outer edge spaced apart from the second surface, the at least one void in the rib is between the second surface and the outer edge such that the at least one strap portion is disposed away from the second surface with the void therebetween.

14. The pillar garnish of claim 12, wherein the rib has an outer edge spaced apart from the second surface, the at least one void in the rib is along the outer edge, and the at least one strap portion is disposed inward of the outer edge adjacent the at least one void.

15. The pillar garnish of claim 12, wherein the rib has an outer edge spaced apart from the second surface, the at least one void is at least two voids, the at least one strap portion is at least two strap portions, a first one of the voids is between the second surface and the outer edge such that a first one of the strap portions is disposed away from the second surface with the first void therebetween, a second one of the voids is along the outer edge, and a second one of the strap portions is disposed inward of the outer edge adjacent the second void.

16. The pillar garnish of claim 12, wherein the rib has an outer edge spaced apart from the second surface, the at least one void is at least two voids, a first one of the voids is between the second surface and the outer edge such that the at least one strap portion is disposed away from the second surface with the first void therebetween, a second one of the voids is along the outer edge, and the at least one strap portion is disposed inward of the outer edge adjacent the second void.

17. A vehicle assembly comprising:
an airbag apparatus including an inflatable airbag body, the airbag body being deployable adjacent a pillar of the vehicle;
a pillar garnish operatively coupled to the vehicle pillar, the pillar garnish including:
a first surface facing a vehicle interior;
a second surface facing the vehicle pillar;
a top edge;
a pair of side edges extending up to the top edge;
at least one corner portion proximate the juncture of the top edge and at least one of the side edges; and
a rib extending outwardly from the second surface, the rib extending along the second surface at least partially between the side edges, the rib including at least one strap portion,
wherein the rib is placed in tension and resists deformation of the at least one corner portion toward the vehicle interior when an inflation force is applied to the second surface adjacent the top edge by deployment of the airbag body, and the rib is placed in compression and the at least one strap portion buckles when an impact force is applied to the first surface.

18. The vehicle assembly of claim 17, wherein the rib includes at least one void that defines the at least one strap portion, the rib has a first width, and the at least one strap portion has a second width less than the first width.

19. The vehicle assembly of claim 18, wherein the rib has an outer edge spaced apart from the second surface, the at least one void in the rib is between the second surface and the outer edge such that the at least one strap portion is disposed away from the second surface with the void therebetween.

20. The vehicle assembly of claim 18, wherein the rib has an outer edge spaced apart from the second surface, the at least one void in the rib is along the outer edge, and the at least one strap portion is disposed inward of the outer edge adjacent the at least one void.

\* \* \* \* \*